United States Patent
Song et al.

(10) Patent No.: US 10,600,578 B2
(45) Date of Patent: *Mar. 24, 2020

(54) ELECTRIC VEHICLE INVERTER MODULE CAPACITORS

(71) Applicant: SF Motors, Inc., Santa Clara, CA (US)

(72) Inventors: Yunan Song, Santa Clara, CA (US); Kangwei Mao, Santa Clara, CA (US); Zhong Nie, Santa Clara, CA (US); Duanyang Wang, Santa Clara, CA (US); Yifan Tang, Santa Clara, CA (US)

(73) Assignees: SF MOTORS, INC., Santa Clara, CA (US); CHONGQING JINKANG NEW ENERGY VEHICLE CO., LTD., Chongqing (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/233,842

(22) Filed: Dec. 27, 2018

(65) Prior Publication Data

US 2019/0333702 A1  Oct. 31, 2019

Related U.S. Application Data

(63) Continuation of application No. 16/110,475, filed on Aug. 23, 2018.

(Continued)

(51) Int. Cl.
*H01G 9/008* (2006.01)
*H01G 9/07* (2006.01)
(Continued)

(52) U.S. Cl.
CPC ......... *H01G 9/008* (2013.01); *H01G 9/0029* (2013.01); *H01G 9/07* (2013.01); *H01G 9/08* (2013.01);
(Continued)

(58) Field of Classification Search
CPC ........ H01G 9/008; H01G 9/0029; H01G 9/08; H01G 9/07; H02M 7/003; B60L 2210/40
See application file for complete search history.

(56) References Cited

U.S. PATENT DOCUMENTS

| | | |
|---|---|---|
| 4,382,156 A | 5/1983 | Jodoin |
| 4,502,107 A | 2/1985 | Nilssen |

(Continued)

FOREIGN PATENT DOCUMENTS

| | | |
|---|---|---|
| CN | 203850295 | 9/2014 |
| CN | 204442853 U | 7/2015 |

(Continued)

OTHER PUBLICATIONS

Non-Final Office Action on U.S. Appl. No. 16/051,182 dated Nov. 2, 2018.

(Continued)

*Primary Examiner* — Nathan Milakovich
(74) *Attorney, Agent, or Firm* — Foley & Lardner LLP; James De Vellis

(57) ABSTRACT

Provided herein is a capacitor module of an inverter module of an electric vehicle. The capacitor module can include a capacitor housing. The capacitor module can include a plurality of positive terminals coupled with a first surface of the capacitor housing and extending from the first surface at a first angle. The capacitor module can include a plurality of negative terminals coupled with the first surface of the capacitor housing and extending from the first surface at the first angle. The capacitor module can include a divider coupled with the first surface of the capacitor housing. The divider can be disposed between the plurality of positive terminals and the plurality of negative terminals. The divider can electrically isolate the plurality of positive terminals from the plurality of negative terminals. The capacitor (Continued)

module can include a plurality of mounting holes formed on an outer surface of the capacitor housing.

20 Claims, 6 Drawing Sheets

Related U.S. Application Data

(60) Provisional application No. 62/663,190, filed on Apr. 26, 2018.

(51) Int. Cl.
  *H02M 7/00* (2006.01)
  *H01G 9/00* (2006.01)
  *H01G 9/08* (2006.01)
(52) U.S. Cl.
  CPC ......... *H02M 7/003* (2013.01); *B60L 2210/40* (2013.01)

(56) References Cited

U.S. PATENT DOCUMENTS

| | | | |
|---|---|---|---|
| 4,584,768 A | 4/1986 | Tosti | |
| 5,365,424 A | 11/1994 | Deam et al. | |
| 5,371,043 A | 12/1994 | Anderson et al. | |
| 5,514,906 A | 5/1996 | Love et al. | |
| 5,783,877 A | 7/1998 | Chitayat | |
| 5,804,761 A | 9/1998 | Donegan et al. | |
| 6,176,299 B1 | 1/2001 | Hanzlik et al. | |
| 6,822,850 B2 | 11/2004 | Pfeifer et al. | |
| 6,843,335 B2 | 1/2005 | Shirakawa et al. | |
| 7,012,810 B2 | 3/2006 | Parkhill et al. | |
| 7,046,535 B2 | 5/2006 | Rodriguez et al. | |
| 7,113,405 B2 | 9/2006 | Armstrong et al. | |
| 7,292,451 B2 | 11/2007 | Rodriguez et al. | |
| 7,505,294 B2 | 3/2009 | Ahmed et al. | |
| 7,551,439 B2 | 6/2009 | Peugh et al. | |
| 7,557,298 B2 | 7/2009 | Vanhoutte et al. | |
| 7,714,230 B2 | 5/2010 | Beulque | |
| 7,742,303 B2 | 6/2010 | Azuma et al. | |
| 7,742,307 B2 | 6/2010 | Ellsworth et al. | |
| 7,777,433 B2 | 8/2010 | Yamaguchi et al. | |
| 7,965,510 B2 | 6/2011 | Suzuki et al. | |
| 7,969,735 B2 | 6/2011 | Nakatsu et al. | |
| 8,059,404 B2 | 11/2011 | Miller et al. | |
| 8,391,008 B2 | 3/2013 | Dede | |
| 8,519,561 B2 | 8/2013 | Azuma et al. | |
| 8,773,007 B2 | 7/2014 | Van De Ven et al. | |
| 8,780,557 B2 | 7/2014 | Duppong et al. | |
| 8,888,506 B2 * | 11/2014 | Nishimura ......... | H01R 12/7082 439/74 |
| 8,947,899 B2 | 2/2015 | Savatski et al. | |
| 8,952,525 B2 | 2/2015 | Ide et al. | |
| 9,007,767 B2 | 4/2015 | Nakajima | |
| 9,439,332 B2 | 9/2016 | Ide et al. | |
| 9,578,788 B2 | 2/2017 | Tang et al. | |
| 9,647,361 B2 * | 5/2017 | Kobuchi ............. | H01R 12/707 |
| 10,122,294 B2 | 11/2018 | Xu et al. | |
| 10,215,504 B2 | 2/2019 | Coteus et al. | |
| 10,236,786 B2 | 3/2019 | Liu et al. | |
| 10,236,791 B1 | 3/2019 | Chung et al. | |
| 10,263,407 B1 * | 4/2019 | Song ................... | B60L 50/50 |
| 2003/0111714 A1 | 6/2003 | Bates et al. | |
| 2003/0133257 A1 | 7/2003 | Beihoff et al. | |
| 2003/0218057 A1 | 11/2003 | Joseph et al. | |
| 2004/0060692 A1 | 4/2004 | Pfeifer et al. | |
| 2004/0227231 A1 | 11/2004 | Maly et al. | |
| 2004/0228094 A1 | 11/2004 | Ahmed et al. | |
| 2006/0092611 A1 | 5/2006 | Beihoff et al. | |
| 2006/0274561 A1 | 12/2006 | Ahmed et al. | |
| 2006/0291165 A1 | 12/2006 | Flesch et al. | |
| 2007/0236883 A1 | 10/2007 | Ruiz | |
| 2007/0246351 A1 | 10/2007 | Smola et al. | |
| 2007/0252169 A1 * | 11/2007 | Tokuyama ............ | H02M 7/003 257/162 |
| 2008/0247139 A1 | 10/2008 | Stahlhut et al. | |
| 2008/0316710 A1 | 12/2008 | Seto et al. | |
| 2009/0129011 A1 | 5/2009 | Balzano | |
| 2010/0025126 A1 | 2/2010 | Nakatsu et al. | |
| 2010/0026090 A1 | 2/2010 | Nakatsu et al. | |
| 2010/0277868 A1 | 11/2010 | Beaupre et al. | |
| 2012/0325447 A1 | 12/2012 | You et al. | |
| 2013/0114210 A1 | 5/2013 | Ebersberger et al. | |
| 2013/0146253 A1 | 6/2013 | Daly | |
| 2013/0146254 A1 | 6/2013 | Jeon et al. | |
| 2013/0235527 A1 | 9/2013 | Wagner et al. | |
| 2014/0133150 A1 | 5/2014 | Pardikes et al. | |
| 2014/0262177 A1 | 9/2014 | Tang et al. | |
| 2014/0307389 A1 | 10/2014 | Arvelo et al. | |
| 2014/0345492 A1 | 11/2014 | Fujito et al. | |
| 2014/0347817 A1 | 11/2014 | Joshi et al. | |
| 2014/0369099 A1 | 12/2014 | Asako | |
| 2015/0003019 A1 | 1/2015 | Ide et al. | |
| 2015/0021756 A1 | 1/2015 | Adachi | |
| 2015/0289391 A1 | 10/2015 | Nakatsu et al. | |
| 2016/0155572 A1 * | 6/2016 | Ramm ................ | H01G 4/40 361/782 |
| 2016/0156278 A1 * | 6/2016 | Ramm ................ | H02B 1/20 361/624 |
| 2016/0183409 A1 | 6/2016 | Zhou et al. | |
| 2016/0242312 A1 | 8/2016 | Singh et al. | |
| 2017/0028869 A1 | 2/2017 | Boddakayala et al. | |
| 2017/0330815 A1 | 11/2017 | Mische et al. | |
| 2018/0184538 A1 * | 6/2018 | Bayerer ................. | H01L 23/10 |
| 2018/0184543 A1 | 6/2018 | Ando et al. | |
| 2018/0198378 A1 | 7/2018 | Xu et al. | |
| 2018/0206359 A1 | 7/2018 | McPherson et al. | |
| 2018/0330895 A1 * | 11/2018 | Nagayoshi ............ | H01L 23/10 |
| 2019/0335607 A1 * | 10/2019 | Song .................. | H05K 7/20927 |
| 2019/0335608 A1 * | 10/2019 | Song .................. | H05K 7/20927 |

FOREIGN PATENT DOCUMENTS

| | | |
|---|---|---|
| CN | 106656021 A | 5/2017 |
| CN | 106848118 A | 6/2017 |
| CN | 107769604 A | 3/2018 |

OTHER PUBLICATIONS

International Search Report and Written Opinion for International Appl. No. PCT/CN2018/125644, dated Apr. 2, 2019.
Non-Final Office Action on U.S. Appl. No. 16/051,190 dated Mar. 13, 2019.
Non-Final Office Action on U.S. Appl. No. 16/051,193 dated Apr. 9, 2019.
Non-Final Office Action on U.S. Appl. No. 16/110,425 dated Apr. 11, 2019.
Non-Final Office Action on U.S. Appl. No. 16/110,475 dated Mar. 13, 2019.
Non-Final Office Action on U.S. Appl. No. 16/110,513 dated May 13, 2019.
Non-Final Office Action on U.S. Appl. No. 16/110,559 dated Feb. 25, 2019.
Non-Final Office Action on U.S. Appl. No. 16/232,981 dated Mar. 13, 2019.
Non-Final Office Action on U.S. Appl. No. 16/233,028 dated Apr. 9, 2019.
Non-Final Office Action on U.S. Appl. No. 16/233,826 dated Apr. 11, 2019.
Non-Final Office Action on U.S. Appl. No. 16/234,242 dated Feb. 25, 2019.
Notice of Allowance on U.S. Appl. No. 16/051,176 dated May 22, 2019.
Notice of Allowance on U.S. Appl. No. 16/051,182 dated Jan. 3, 2019.
Notice of Allowance on U.S. Appl. No. 16/051,991 dated May 20, 2019.

(56) References Cited

OTHER PUBLICATIONS

Notice of Allowance on U.S. Appl. No. 16/234,238 dated Feb. 20, 2019.
International Search Report and Written Opinion on PCT/CN2019/079352 dated Jun. 8, 2019 (11 pages).
Notice of Allowance on U.S. Appl. No. 16/051,176 dated Jul. 31, 2019.
Notice of Allowance on U.S. Appl. No. 16/051,190 dated Jul. 1, 2019.
Notice of Allowance on U.S. Appl. No. 16/051,193 dated Jul. 3, 2019.
Notice of Allowance on U.S. Appl. No. 16/051,991 dated Jun. 18, 2019.
Notice of Allowance on U.S. Appl. No. 16/110,425 dated Jul. 30, 2019.
Notice of Allowance on U.S. Appl. No. 16/232,981 dated Aug. 13, 2019.
Notice of Allowance on U.S. Appl. No. 16/233,028 dated Jul. 3, 2019.
Notice of Allowance on U.S. Appl. No. 16/233,826 dated Jul. 31, 2019.
Notice of Allowance on U.S. Appl. No. 16/110,513 dated Oct. 17, 2019 (2 pages).
Notice of Allowance on U.S. Appl. No. 16/051,190 dated Nov. 7, 2019 (10 pages).
Notice of Allowance on U.S. Appl. No. 16/234,242 dated Oct. 24, 2019 (11 pages).

* cited by examiner

ELECTRIC VEHICLE INVERTER MODULE CAPACITORS

CROSS REFERENCE TO RELATED APPLICATION

The present application claims the benefit of priority under 35 U.S.C. § 120 as a continuation of U.S. patent application Ser. No. 16/110,475, filed Aug. 23, 2018 and titled "ELECTRIC VEHICLE INVERTER MODULE CAPACITORS," which claims the benefit of priority under 35 U.S.C. § 119(e) to U.S. Provisional Application 62/663,190, filed on Apr. 26, 2018, tilted "ELECTRIC VEHICLE INVERTER MODULE CAPACITORS," each of which is incorporated herein by reference in its entirety.

BACKGROUND

Batteries can include electrochemical materials to supply electrical power to various electrical components connected thereto. Such batteries can provide electrical energy to various electrical systems.

SUMMARY

Systems and methods described herein relate to a multiple phase inverter module formed having three power modules (which can also be referred to herein as half-bridge modules, half-bridge inverter modules or sub-modules) arranged for example in a triplet configuration for electric vehicle drive systems. Each power module can include at least one capacitor module. The inverter module can be coupled with a drive train unit of an electric vehicle and can provide three phase voltages to the drive train unit. For example, each of the power modules having at least one capacitor module can generate a single phase voltage and thus, the three power modules arranged in a triplet configuration can provide three phase voltages.

At least one aspect is directed to a capacitor module of an inverter module to provide electrical power to an electric vehicle. The capacitor module can include a capacitor housing. The capacitor module can include a plurality of positive terminals coupled with a first surface of the capacitor housing and extending from the first surface at a first angle. The capacitor module can include a plurality of negative terminals coupled with the first surface of the capacitor housing and extending from the first surface at the first angle. The capacitor module can include a divider coupled with the first surface of the capacitor housing. The divider can be disposed between the plurality of positive terminals and the plurality of negative terminals. The divider can electrically isolate the plurality of positive terminals from the plurality of negative terminals. The capacitor module can include a plurality of mounting holes formed on an outer surface of the capacitor housing.

At least one aspect is directed to a method of providing a capacitor module of an inverter module of an electric vehicle. The method can include providing a capacitor housing of a capacitor module. The method can include coupling a plurality of positive terminals with a first surface of the capacitor housing such that the plurality of positive terminals extend from the first surface at a first angle. The method can include coupling a plurality of negative terminals with the first surface of the capacitor housing such that the plurality of negative terminals extend from the first surface at the first angle. The method can include disposing a divider between the plurality of positive terminals and the plurality of negative terminals. The divider can couple with the first surface of the capacitor housing. The divider can electrically isolate the plurality of positive terminals from the plurality of negative terminals. The method can include forming a plurality of mounting holes on an outer surface of the capacitor housing.

At least one aspect is directed to a method of providing a capacitor module of an inverter module of an electric vehicle. The method can include providing a capacitor module of an inverter module of an electric vehicle. The capacitor module can include a capacitor housing. The capacitor module can include a plurality of positive terminals coupled with a first surface of the capacitor housing and extending from the first surface at a first angle. The capacitor module can include a plurality of negative terminals coupled with the first surface of the capacitor housing and extending from the first surface at the first angle. The capacitor module can include a divider coupled with the first surface of the capacitor housing. The divider can be disposed between the plurality of positive terminals and the plurality of negative terminals. The divider can electrically isolate the plurality of positive terminals from the plurality of negative terminals. The capacitor module can include a plurality of mounting holes formed on an outer surface of the capacitor housing.

At least one aspect is directed to an electric vehicle. The electric vehicle can include a capacitor module of an inverter module of an electric vehicle. The capacitor module can include a capacitor housing. The capacitor module can include a plurality of positive terminals coupled with a first surface of the capacitor housing and extending from the first surface at a first angle. The capacitor module can include a plurality of negative terminals coupled with the first surface of the capacitor housing and extending from the first surface at the first angle. The capacitor module can include a divider coupled with the first surface of the capacitor housing. The divider can be disposed between the plurality of positive terminals and the plurality of negative terminals. The divider can electrically isolate the plurality of positive terminals from the plurality of negative terminals. The capacitor module can include a plurality of mounting holes formed on an outer surface of the capacitor housing.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Following below are more detailed descriptions of various concepts related to, and implementations of battery cells for battery packs in electric vehicles. The various concepts introduced above and discussed in greater detail below can be implemented in any of numerous ways.

Systems and methods described herein relate to a capacitor module of an inverter module of a drive train unit of an electric vehicle. For example, the inverter module can include one or more power modules, with each power module having at least one capacitor module. The inverter module can generate a single phase voltage or a multiple phase voltage (e.g., three phase voltage) to power electrical components within an electrical vehicle. The power modules can include individual sub-systems, such as a capacitor module, laminated bus bar or heat sink module, to provide a compact design. The modular design of each of the sub-systems, including the capacitor module, of the power module can provide for lower scrap rate in production since, for example, each of the individual sub-systems can be individually removed, repaired, or replaced if there is problem in quality check step.

Figure 1:
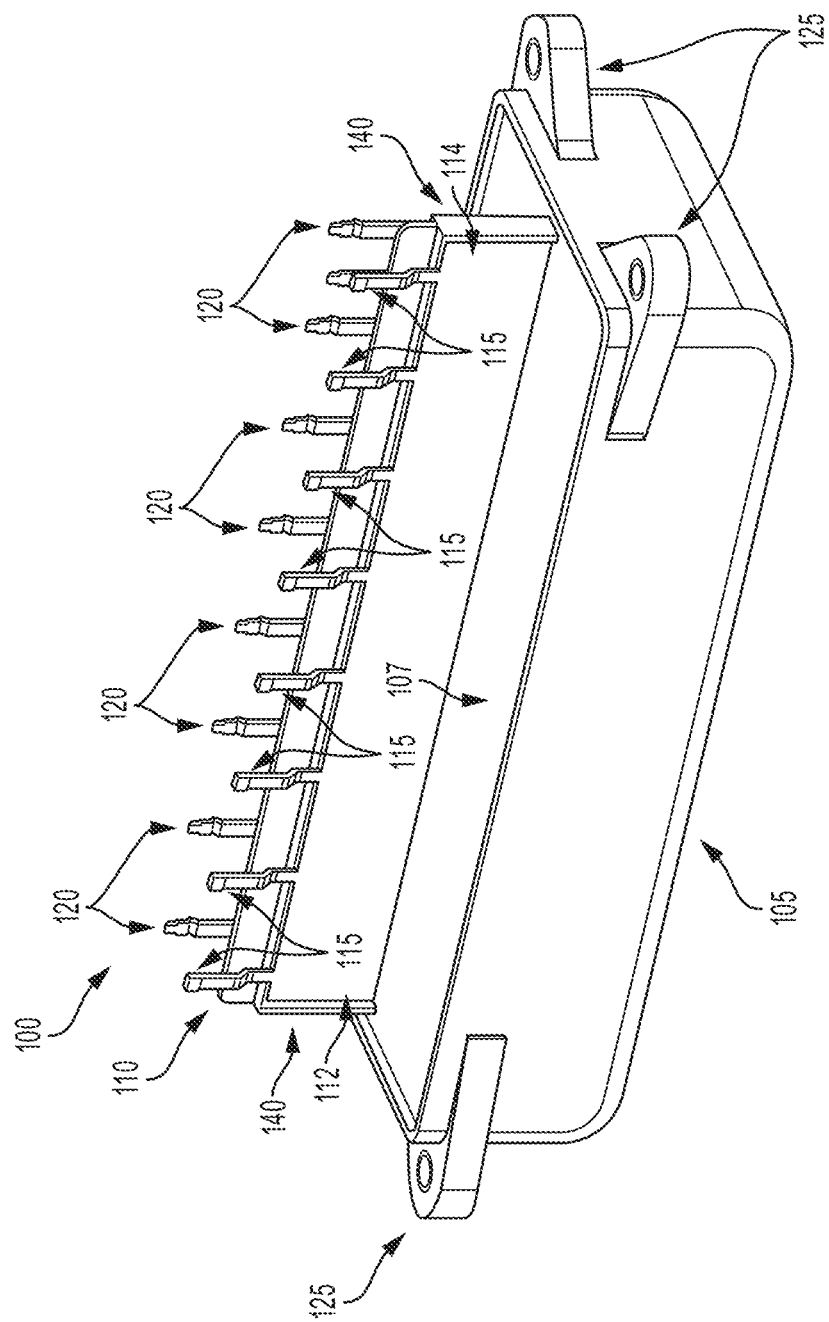
FIG. 1 depicts an example view of a capacitor module of an inverter module of a drive unit of an electric vehicle; according to an illustrative implementation.

FIG. 1, among others, depicts a capacitor module 100. The capacitor module 100 can be a component of an inverter module of a drive train unit of an electric vehicle. (e.g., inverter module 450 of electric vehicle 405 of FIG. 4). For example, the capacitor module 100 can be a component of a single phase power module that can be coupled with two other single phase power modules to form a three phase inverter module of a drive train unit of an electric vehicle. The capacitor module 100 can operate with the inverter module to provide electrical power to an electric vehicle.

The capacitor module 100 can include a capacitor housing 105. The capacitor housing 105 can form an outer surface or base area of the capacitor module 100. The capacitor housing 105 can provide passive cooling to the capacitor module 100. For example, the capacitor housing 105 can provide passive cooling to a bottom portion or bottom area that is generally under or disposed adjacent to electrical components of the capacitor module 100 and provide passive cooling to the electrical components of the capacitor module 100. The passive cooling can be provided by the environment around the capacitor module 100. For example, the capacitor housing 105 can be exposed to air in the environment around the capacitor module 100 that can be used to cool or provide passive cooling to the capacitor housing 105. The capacitor housing 105 can include a variety of different materials, including but not limited to, plastic material. The dimensions of the capacitor housing 105 can vary and can be selected based at least in part on the dimensions of an inverter module the capacitor housing 105 is to be a disposed within. For example, the capacitor housing 105 can have a height in a range from 30 mm to 40 mm (e.g., 32 mm). The capacitor housing 105 can have a width in a range from 60 mm to about 70 mm (e.g., 66 mm). The capacitor housing 105 can have a length in a range from 140 mm to about 155 mm (e.g., 150 mm). The dimensions, such as the height, width and length, of the capacitor housing 105 can vary within or outside these ranges. The capacitor housing 105 can define a housing to support and hold the components of the capacitor module 100, such as but not limited to, positive terminals (e.g., positive terminals 115), negative terminals (e.g., negative terminals 120), and a divider (e.g., divider 110). One or more capacitor elements can be disposed within the capacitor housing 105. For example, the capacitor housing 105 can house a single capacitor film roll or multiple capacitor film rolls (e.g., three to four capacitor film rolls). The capacitor film rolls can be coupled with positive terminals and the negative terminals within the capacitor housing 105 through one or more tabs. The capacitor film rolls and thus the capacitor module 100 can have a capacitance value of 200-400 nanofarads (nF), e.g., 300 nF. The capacitance value can vary within or outside this range.

The capacitor module 100 can include at least one first polarity (e.g., positive) terminal 115 and at least one second polarity (e.g., negative) terminal 120. For example, and as depicted in FIG. 1, the capacitor module 100 can include a plurality of positive terminals 115 and a plurality of negative terminals 120. The positive terminals 115 can correspond to leads or terminals of a positive bus bar of the capacitor module 100. The negative terminals 120 can correspond to leads or terminals of a negative bus bar of the capacitor module 100. For example, the capacitor module 100 can include a positive bus bar and a negative bus bar disposed within the capacitor housing 105. The positive terminals 115 can include leads, terminals or extensions of the positive bus bar that extend out of the capacitor module 100 to couple with leads of other components of an inverter module, such as but not limited to, transistors leads of a plurality of transistors of the inverter module. The negative terminals 120 can include leads, terminals or extensions of the negative bus bar that extend out of the capacitor module 100 to couple with leads of other components of an inverter module, such as but not limited to, transistors leads of a plurality of transistors of the inverter module. The positive terminals 115 can include conductive material, such as but not limited to copper. The positive terminals 115 can have a thickness or width in a range from of 0.5 mm to 1.5 mm (e.g., 1 mm). The positive terminals 115 can have a length in a range from 0.5 mm to 1.5 mm. The positive terminals 115 can have a height in a range from 1 mm to 6 mm. The thickness, width, length, or height of the positive terminals 115 can vary within or outside this range. The negative terminals 120 can include conductive material, such as but not limited to copper. The negative terminals 120 can have a thickness or width in a range from of 0.5 mm to 1.5 mm (e.g., 1 mm). The negative terminals 120 can have a length in a range from 0.5 mm to 1.5 mm. The negative terminals 120 can have a height in a range from 1 mm to 6 mm. The thickness, width, length, or height of the negative terminals 120 can vary within or outside this range.

The capacitor module 100 can include a divider 110. The divider 110 can be disposed between positive terminals 115 and negative terminals 120 of the capacitor module 100. For example, the divider 110 can electrically isolate or electrically insulate the positive terminals 115 from the negative terminals 120. The divider 110 can include non-conductive material, insulation material, or plastic material. The shape and dimensions of the divider 110 can vary and can be selected based at least in part on the shape and dimensions of the positive terminals 115 and the negative terminals 120. For example, a thickness or width of the divider 110 can range from 0.8 mm to 1 mm. A length of the divider 110 can range from 130 mm to 145 mm (e.g., 140 mm). A height of the divider 110 can range from 20 mm to 30 mm (e.g., 25 mm). This height can include an extension portion (e.g., extension portion 230 of FIG. 2). The thickness, width, length or height of the divider 100 can vary within or outside these ranges.

The divider 110 can include at least two divider support members 140. The divider support members 140 can be disposed at opposing ends of the divider 110. For example, a first divider support member 140 can couple with a first side surface 112 or first edge surface 112 of the divider 110. A second divider support member 140 can couple with a second side surface 114 or second edge surface 114 of the divider 110. The first side surface 112 (or first edge surface) of the divider 110 can be an opposite or opposing surface with respect to the second side surface 114 (or second edge surface) of the divider 110. For example, the first side surface 112 can correspond to an opposite end of the divider 140 as compared to the second side surface 114.

The divider support members 140 can hold or support the positive terminals 115 and the negative terminals 120. For example, the divider support members 140 can couple or hold portions of the positive terminals 115 in contact with the divider 110. The divider support members 140 can couple or hold portions of the negative terminals 120 in contact with the divider 110. The divider support members 140 can provide electrical insulation between the positive terminals 115 and the negative terminals 120 and other components of an inverter module. The divider support members 140 can include non-conductive material, insulation material, or plastic material. The divider support members 140 can have a thickness or width in a range from 5 mm to 6 mm (e.g., 5.4 mm). The divider support members 140 can have a height in a range from 18 mm to 20 mm. The divider support members 140 can have a length in a range from 1 mm to 5 mm. The height, width, thickness, or length of the divider support members 140 can vary within or outside these ranges.

The capacitor modules 100 described herein can include mounting holes 125 to receive or engage connection points on a heat sink component of an inverter module such that the heat sink can provide active cooling to the respective capacitor module 100. The mounting holes 125 can provide a connection point to secure the respective capacitor module 100 within an inverter module to reduce vibration effects on the respective capacitor module 100. The capacitor module 100 can include positive terminals 115 and negative terminals 120 having a predetermined shape to provide an easier and more reliable connection to other electrical components of the inverter module.

The capacitor module 100 can include a plurality of mounting holes 125 to couple the capacitor module 100 with one or more components of an inverter module of a drive train unit of an electric vehicle. For example, the capacitor module 100 can be disposed within or coupled with an inverter module using the plurality of mounting holes 125. The mounting holes 125 can receive or engage connection points on a heat sink, such as but not limited to, mounting feet formed on the heat sink to couple the heat sink with the capacitor module 100 (e.g., heat sink 305 of FIG. 3). The heat sink can provide active cooling to the capacitor module 100. Therefore, the capacitor module 100 can provide cooling from at least two different sources and at two different surfaces. For example, the capacitor module 100 can receive active cooling at a first surface 107 or first portion (e.g., top surface, top portion) from the heat sink and passive cooling at a second surface or second portion (e.g., bottom surface, bottom portion) from the capacitor housing 105

The mounting holes 125 can include or be formed as connection points on one or more portions on the capacitor housing 105. The mounting holes 125 can include holes, orifices, or hollow portions formed through one or more portions of the capacitor housing 105. The mounting holes 125 can be formed completely though a portion of the capacitor housing 105 or may be formed to a certain depth into a surface of the capacitor housing 105. The mounting holes 125 may include a threaded inner surface to receive or engage a threaded outer surface of a fastener, screw or bolt. The mounting holes 125 can have a round shape, spherical shape, rectangular shape or other shape. The mounting holes 125 can have a variety of different shapes, sizes or dimensions and the shape, size or dimensions of a particular mounting hole 125 can be selected based at least in part on the dimensions of the capacitor module 100.

Figure 2:
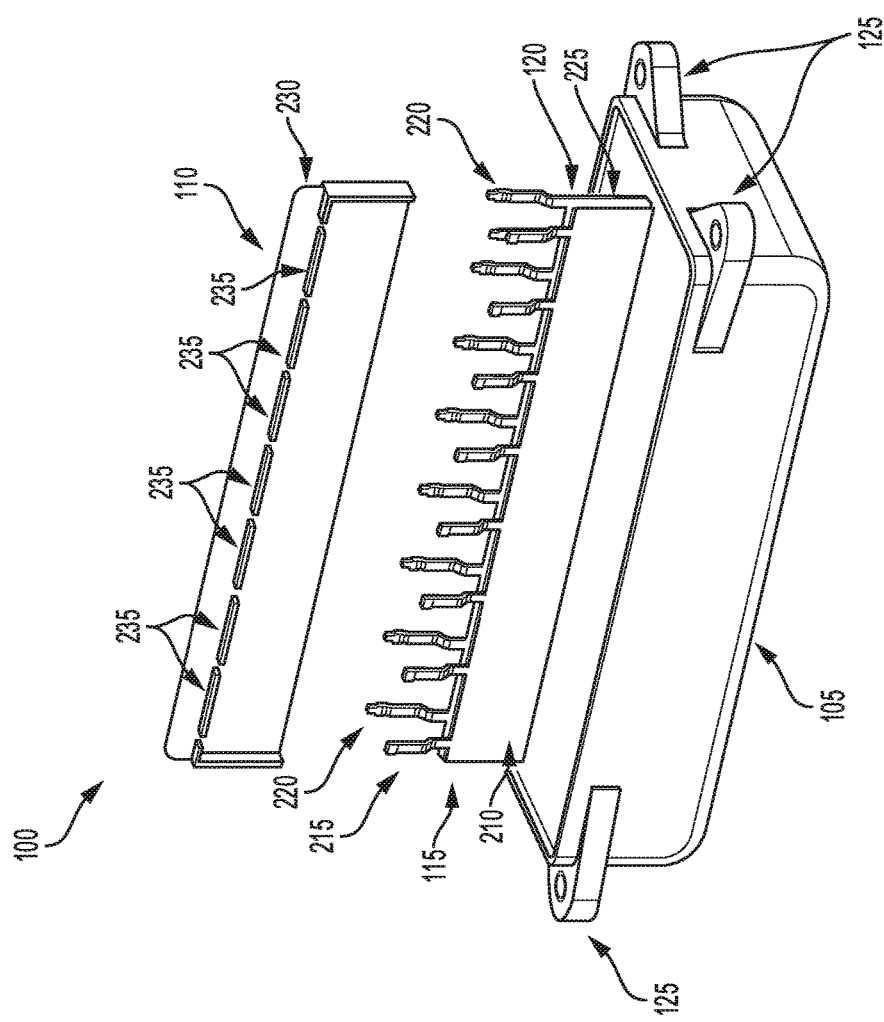
FIG. 2 depicts an example exploded view of the capacitor module of FIG. 1 having a divider disposed between positive and negative terminals of the capacitor module, according to an illustrative implementation.

Referring to FIG. 2, among others, an exploded view 200 of the capacitor module 100 is provided illustrating the positional relationship between the positive terminals 115 and negative terminals 120 disposed between the divider 110 of the capacitor module 100. The positive terminals 115 can be formed having a variety of different shapes and a particular shape of the positive terminals 115 can be selected based at least in part on parasitic inductance values or the shape of the components the positive terminals 115 are to be coupled with. For example, the positive terminals 115 can be formed having an "S" shape, curved shape, curved stamped shape or bent shape to provide low parasitic inductance. The "S" shape, curved shape, curved stamped shape or bent shape may provide for an easier weld or more reliable, stronger weld to other components or electrical elements within an inverter module. The positive terminals 115 may be formed having a straight shape. The positive terminals 115 can extend from a first surface 107 of the capacitor housing 105 at a predetermined angle. The predetermined angle can range from 45 degrees to 135 degrees with respect to the first surface 107 (e.g., top surface) of the capacitor housing 105. For example, the first angle can include 90 degrees (e.g., perpendicular) with respect to the first surface 107 of the capacitor housing 105. The positive terminals 115 can be formed from conductive material, such as but not limited to copper. The positive terminals 115 can couple with the capacitor housing 105 such that a portion of each of the positive terminals 115 extends into an inner region formed by the capacitor housing 105 can couples with capacitive elements within the capacitor housing 105. The positive terminals 115 can couple with or correspond to leads or terminals of a positive bus bar of the capacitor module 100.

The positive terminals 115 can be formed such that a first portion 210 has a first shape and a second portion 215 has a second, different shape. For example, the positive terminals 115 can include a first portion 210 having a straight or flat shape. The first portion 210 can correspond to a positive base portion 210 of the positive terminals 115. A length of the positive base portion 210 can range from 130 mm to 145 mm (e.g., 140 mm). A width or thickness of the positive base portion 210 can range from 0.5 mm to 1 mm. A height of the positive base portion 210 can range from 16 mm to 26 mm (e.g., 20 mm). The thickness, width, length or height of the positive base portion 210 can vary within or outside these ranges. The positive base portion 210 can include conductive material, such as but not limited to copper.

The positive terminals 115 can include a second portion 215 having a plurality of positive leads 215 (e.g., finger portions) that extend out from the first portion 210 (e.g., positive base portion) of the positive terminals 115. The plurality of positive leads 215 of the second portion can include an "S" shape, curved shape, curved stamped shape or bent shape to provide low parasitic inductance. The positive leads 215 can have a thickness or width in a range from of 0.5 mm to 1.5 mm (e.g., 1 mm). The positive leads 215 can have a length in a range from 0.5 mm to 1.5 mm. The positive leads 215 can have a height (distance extending from a top surface of the positive base portion 210) in a range from 15 mm to 40 mm. The thickness, width, length, or height of the positive leads 215 of the positive terminals 115 can vary within or outside this range. The positive leads 215 can include conductive material, such as but not limited to copper.

The negative terminals 120 can have a variety of different shapes and a particular shape of the negative terminals 120 can be selected based at least in part on parasitic inductance values or the shape of the components the negative terminals 120 are to be coupled with. For example, the negative terminals 120 can be formed having an "S" shape, curved shape, curved stamped shape or bent shape to provide low parasitic inductance. The "S" shape, curved shape, curved stamped shape or bent shape may provide for an easier weld or more reliable, stronger weld to other components or electrical elements within an inverter module. The negative terminals 120 may be formed having a straight shape. The negative terminals 120 can extend from a first surface 107 of the capacitor housing 105 at a predetermined angle. The predetermined angle can range from 45 degrees to 135 degrees with respect to the first surface 107 (e.g., top surface) of the capacitor housing 105. For example, the first angle can include 90 degrees (e.g., perpendicular) with respect to the first surface 107 of the capacitor housing 105. The negative terminals 120 can be formed from conductive material, such as but not limited to copper. The negative terminals 120 can couple with the capacitor housing 105 such that a portion of each of the negative terminals 120 extends into an inner region formed by the capacitor housing 105 can couples with capacitive elements within the capacitor housing 105. The negative terminals 120 can couple with or correspond to leads or terminals of a negative bus bar of the capacitor module 100.

The negative terminals 120 can be formed such that a first portion 225 has a first shape and a second portion 220 has a second, different shape. For example, the negative terminals 120 can include a first portion 225 having a generally straight or flat shape. The first portion 225 can correspond to a negative base portion 225 of the negative terminals 120. A length of the negative base portion 225 can range from 130 mm to 145 mm (e.g., 140 mm). A width or thickness of the negative base portion 225 can range from 0.5 mm to 1 mm. A height of the negative base portion 225 can range from 16 mm to 26 mm (e.g., 20 mm). The thickness, width, length or height of the negative base portion 225 can vary within or outside these ranges. The negative base portion 225 can include conductive material, such as but not limited to copper.

The negative terminals 120 can include a second portion 220 having a plurality of negative leads 220 (e.g., finger portions) that extend out from the first portion 225 (e.g., negative base portion) of the negative terminals 120. The plurality of negative leads 220 of the second portion 220 can include an "S" shape, curved shape, curved stamped shape or bent shape to provide low parasitic inductance.

The negative leads 220 can have a thickness or width in a range from of 0.5 mm to 1.5 mm (e.g., 1 mm). The negative leads 220 can have a length in a range from 0.5 mm to 1.5 mm. The negative leads 220 can have a height (distance extending from a top surface of the negative base portion 225) in a range from 15 mm to 40 mm. The thickness, width, length, or height of the negative leads 220 of the negative terminals 120 can vary within or outside this range. The negative leads 220 can include conductive material, such as but not limited to copper.

The positive terminals 115 and the negative terminals 120 can have the same shape and dimensions or having different shapes and dimensions. The positive terminals 115 and the negative terminals 120 can include conductive material, such as but not limited to copper. The positive terminals 115 and the negative terminals 120 can have a variety of different lengths and the particular length of the positive terminals 115 and the negative terminals 120 can be selected based at least in part on the dimensions of the capacitor module 100 and other components of an inverter module the positive terminals 115 and the negative terminals 120 are to be coupled with, such as but not limited to, transistors of the inverter module.

The first portions 210, 225 or base portions 210, 225 of the positive terminals 115 and the negative terminals 120 can be spaced a predetermined distance from each other. The predetermined distance between the base portions 210, 225 of the positive terminals 115 and the negative terminals 120 can be selected based upon a desired or required inductance value or a desired electromagnetic interference (EMI) noise value. For example, the predetermined distance between the positive base portion 210 of the positive terminals 115 and the negative base portion 225 of the negative terminals 120 can be selected to reduce inductance value of components of the inverter module or reduce EMI noise within the inverter module. The positive base portion 210 of the positive terminals 115 and the negative base portion 225 of the negative terminals 120 can be spaced a distance of 0.8 mm to 1 mm from each other. The distance between the positive base portion 210 of the positive terminals 115 and the negative base portion 225 of the negative terminals 120 can vary within or outside this range.

The second portions 215, 220 or leads 215, 220 of the positive terminals 115 and the negative terminals 120 can be spaced a predetermined distance from each other. The predetermined distance between the positive leads 215 of the positive terminals 115 and the negative leads 220 of the negative terminals 120 can be selected based upon a desired or required inductance value or a desired electromagnetic interference (EMI) noise value. For example, the predetermined distance between the positive leads 215 of the positive terminals 115 and the negative leads 220 of the negative terminals 120 can be selected to reduce inductance value of components of the inverter module or reduce EMI noise within the inverter module. The positive leads 215 of the positive terminals 115 and the negative leads 220 of the negative terminals 120 can be spaced a distance in a range from 6 mm to 10 mm (e.g., 8 mm) from each other. The distance between the positive leads 215 of the positive terminals 115 and the negative leads 220 of the negative terminals 120 can vary within or outside this range.

The positive leads 215 of the positive terminals 115 can include a positive finger portion 170. The positive finger portion 170 can be an extension of the positive leads 215. The positive finger portion can couple with multiple components of an inverter module. For example, the positive finger portions 170 can be positioned or arranged such that they can couple with a transistor and a gate drive printed circuit board (PCB) of an inverter module. The positive finger portions 170 can have a height in a range of 0.5 mm to 1 mm. The height of the positive finger portions 170 can vary within or outside this range. At least one of the positive leads 215 of the positive terminals 115 can include a positive finger portion 170. For example, a single positive lead 215 of the positive terminals 115 can include a positive finger portion 170 or multiple positive leads 215 of the positive terminals 115 can include positive finger portions 170.

The negative leads 220 of the negative terminals 120 can include a negative finger portion 170. The negative finger portion 170 can be an extension of the negative leads 220. The negative finger portion 170 can couple with multiple components of an inverter module. For example, the negative finger portions 170 can be positioned or arranged such that they can couple with a transistor and a gate drive printed circuit board (PCB) of an inverter module. The negative finger portions 170 can have a height in a range of 0.5 mm to 1 mm. The height of the negative finger portions 170 can vary within or outside this range. At least one of the negative leads 220 of the negative terminals 120 can include a negative finger portion 170. For example, a single negative lead 220 of the negative terminals 120 can include a negative finger portion 170 or multiple negative leads 220 of the negative terminals 120 can include negative finger portions 170. The capacitor module 100 may include only positive finger portions 170 or only negative portions 170.

The number of leads 215 of the positive terminals 115 and the number of leads 220 of the negative terminals 120 can vary and can be selected based in part on a number of transistors the positive leads 215 and the positive leads 200 are to be coupled with within an inverter module. For example, FIG. 2 depicts eight positive leads 215 of the positive terminals 115 and eight negative leads 220 of the negative terminals 120 to couple with eight transistors. The number of leads of the capacitor module 100 can range from six leads (e.g., six positive leads 215 and six negative leads 220) to sixteen leads (e.g., sixteen positive leads 215 and sixteen negative leads 220). The number of positive leads 215 of the positive terminals 115 and the number of negative leads 220 of the negative terminals 120 can vary within or outside this range.

As depicted in FIG. 2, among others, the divider 110 can include a plurality of divider separating elements 235 formed or disposed on side surfaces 237 of the divider. The plurality of divider separating elements 235 can provide electrical insulation or electrical isolation between the positive leads 215 of the positive terminals 115, the negative leads 220 of the negative terminals 120 and other components of the inverter module, such as but not limited to, transistors coupled to the positive leads 215 of the positive terminals 115 and the negative leads 220 of the negative terminals 120. The divider separating elements 235 can include non-conductive material, insulation material, or plastic material. Each of the divider separating elements 235 can be formed at the same height with respect to a bottom surface or bottom end border of the divider 110. One or more of the divider separating elements 235 can be formed a different height with respect to a bottom surface or bottom end border of the divider 110 as compared to one or more other divider separating elements 235. The divider separating elements 235 can be formed at a height in a range from 18 mm to 22 mm with respect to a bottom surface or bottom end border of the divider 110. The height or position along the side surfaces of the divider 110 that the divider separating elements 235 are disposed at or formed at can vary within or outside this range.

The divider 110 can include an extension portion 230 that extends beyond or above the plurality of divider separating elements 235. A height of the extension portion 230 with respect to a height of the divider separating elements 235 (e.g., a highest divider separating element 235 with respect to a bottom surface or bottom end border of the divider 110) can vary and can be selected based at least in part on the dimensions of the other components of an inverter module. For example, the extension portion 230 can be designed, formed or positioned such that it extends to, contacts or couples with transistors of the inverter module. Therefore, the extension portion 230 can provide insulation between the positive leads 215 of the positive terminals 115 and negative leads 220 of the negative terminals 120 that coupled with transistors of the inverter module. The extension portion 230 can have a height in a range from 1 mm to 4 mm beyond or above the height of plurality of divider separating elements 235 are formed at with respect to a bottom surface or bottom end border of the divider 110. The height of the extension portion 230 can vary within or outside this range. The extension portion 230 can include non-conductive material, insulation material, or plastic material.

The divider 110 can be formed or positioned such that it is at a center portion of a first surface 107 of the capacitor housing 105. For example, the divider 110 can be formed such that it is disposed along a center line of the capacitor housing 105. The position of the divider 110 can vary and can be selected based at least in part on the positioning of other components of an inverter module. For example, the position of the divider 110 can be positioned along a left portion of the first surface 107 of the capacitor housing 105, along a right portion of the first surface 107 of the capacitor housing 105 or a predetermined distance from a center line of the first surface 107 of the capacitor housing 105. The particular position of the divider 110 along the first surface 107 of the capacitor housing 105 can be selected based at least in part on packaging demands.

Figure 3:
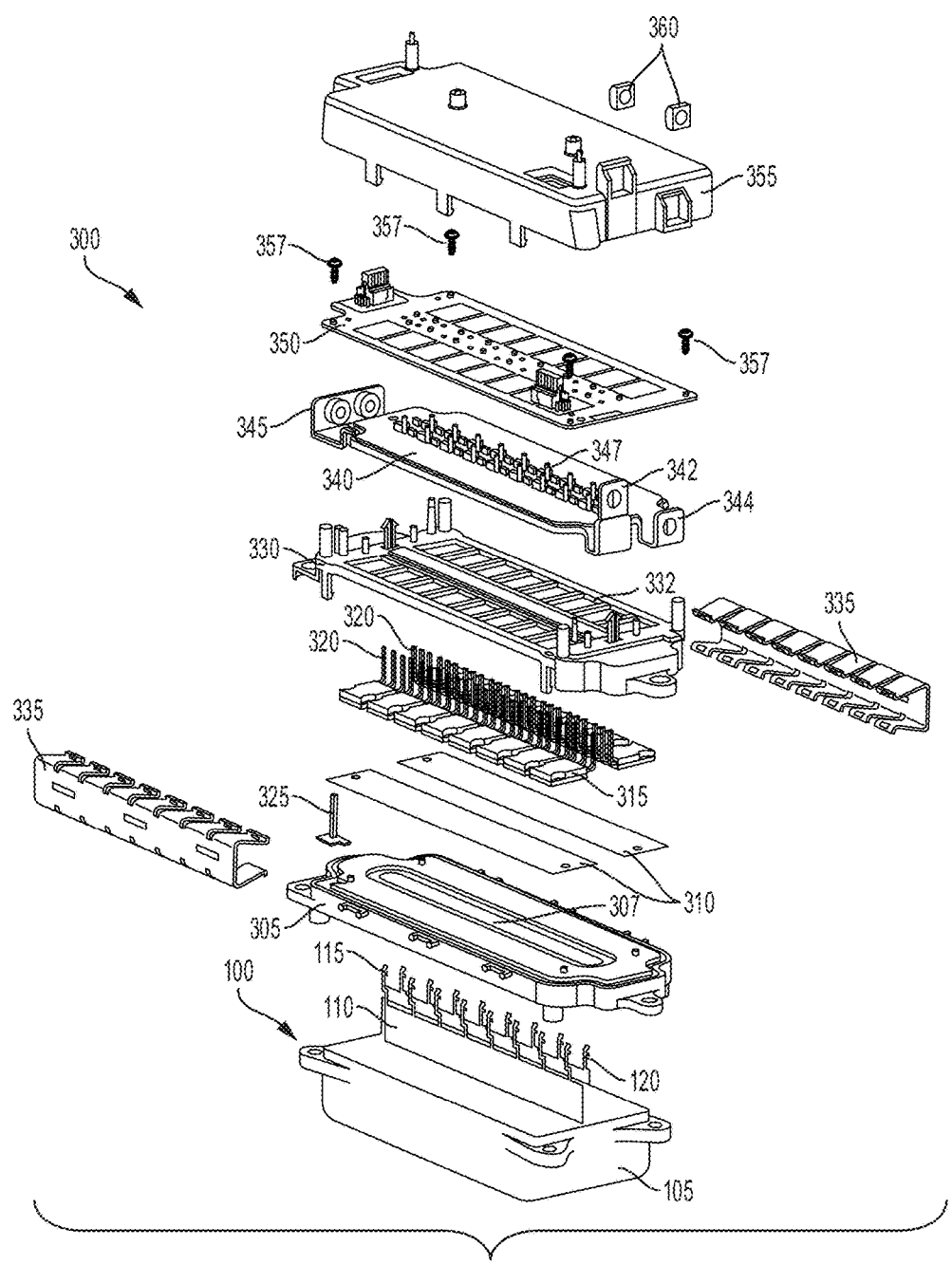
FIG. 3 is an example exploded view of a single phase power module of a multiple phase inverter module of a drive unit of an electric vehicle; according to an illustrative implementation.

FIG. 3, among others, depicts a cross-sectional view of a power module 300. The power module 300 can include a capacitor module 100 having a capacitor housing 105, a plurality of positive terminals 115, a plurality of negative terminals 120, and a divider 110 disposed between the plurality of positive terminals 115 and the plurality of negative terminals 120. The power module 300 can be one power module of a multiple phase inverter module (e.g., inverter module 450 of FIG. 4) disposed within a drive train unit of an electric vehicle (e.g., electric vehicle 405 of FIG. 4) to power the respective electric vehicle. For example, the power module 300 can couple with two other power modules 300 in a triplet configuration to form a three-phase inverter module (e.g., inverter module 450 of FIG. 4). Each of the power modules 300 can be formed having the same components and dimensions to provide inverter functionality based at least in part on the modular design (e.g., ease of assembly) and ability to be adapted for a variety of different inverter applications. The power module 300 can be formed having a length in a range from 220 mm to 230 mm. The power module 300 can be formed having a width in a range from 80 mm to 90 mm. The power module 300 can be formed having a height in a range from 60 mm to 70 mm. The dimensions and size of the power modules 300 described herein can vary outside these ranges.

As depicted in the example of FIG. 3, the power module 300 can include at least one capacitor module 100. The capacitor module 100 includes a capacitor housing 105, a plurality of positive terminals 115, a plurality of negative terminals 120, and a divider 110 disposed between the plurality of positive terminals 115 and the plurality of negative terminals 120.

The power module 300 can include at least one heat sink 305 having a first surface (e.g., top surface) and a second surface (e.g., bottom surface). The second surface of the heat sink 305 can be coupled with, disposed over or otherwise in contact with the first surface of the capacitor module 100. For example, the positive terminals 115, the negative terminals 120, and the divider 110 can extend through an inner open region of the heat sink 305. The heat sink 305 can include a variety of different materials, such as but not limited to, conductive material, metal material, metallic material or aluminum. The heat sink 305 can provide active cooling to the capacitor module 100. For example, the heat sink 305 can be disposed proximate to at least one surface, here the first surface (e.g., top surface) of the capacitor module 100 and the heat sink 305 can provide active cooling to the first surface of the capacitor module 100. For example, the heat sink 305 can have a shape that defines one or more cooling channels formed within the heat sink 305. The cooling channels can receive and be shaped to allow coolant to flow through the heat sink 305 such that the heat sink 305 can provide active cooling to components and electronics (e.g., capacitor module 100, transistors 315) disposed proximate to surfaces of the heat sink 305.

The heat sink 305 can have a length in a range from 200 mm to 225 mm (e.g., 215 mm). The heat sink 305 can have a height (e.g., thickness) in a range from 5 mm to 20 mm (e.g., 10 mm). The heat sink 305 can have a width in a range from 45 mm to 65 mm (e.g., 52 mm). The length, height, and width of the heat sink 305 can vary within and outside these ranges. The heat sink 305 can be disposed within the power module 300 such that the heat sink 305 surrounds, is disposed about, or disposed around a portion of terminals 115, 120 of the capacitor module 100 that couple with transistors (e.g., transistors 315) of the power module 300. For example, the heat sink 305 can include an aperture 307 (e.g., hole, orifice) formed in a middle portion of the heat sink 305. The capacitor module 100 can couple with the heat sink 305 such that the divider 110, positive terminals 115, and negative terminals 120 extend through the aperture 307 of the heat sink 305. Thus, the heat sink 305 can be positioned such that it surrounds surfaces of the divider 110, positive terminals 115, and negative terminals 120 to provide active cooling to the divider 110, positive terminals 115, negative terminals 120, and transistors. For example, in operation, the capacitor module 100 can generate heat and may not receive enough cooling (e.g., passive cooling, active cooling). The heat generation inside the capacitor module 100 can reduce the life of the respective capacitor module 100 if not properly dissipated. Further, the capacitor module 100 may be the largest component of the power module 300 and therefore can be difficult to install or dispose within the power module 300. The capacitor module 100 can be the heaviest component of the power module 300 and therefore can be prone to damage caused by vibration, such as but not limited to, when the electric vehicle is in motion. Thus, the capacitor modules 100 described herein can include one or more components to provide active cooling (e.g., heat sink 305), passive cooling, enable the respective capacitor module 100 to be easily coupled with or disposed within the power module 300 and reduce vibration or reduce an impact of vibration on the capacitor module 100 when, for example, an electric vehicle is in motion.

The heat sink 305 can be positioned such that cool surfaces and coolant flowing through the heat sink 305 are disposed closer to these electrical components. Thus, the heat sink 305 can provide active cooling to each of the capacitor module 100, the positive terminals 115, the negative terminals 120 and transistors of the power module 300 to reduce inductance value in the power module 300 and reduce EMI noise in the inverter module. The heat sink aperture 307 can have a width in a range from 10 mm to 20 mm (e.g., 12 mm). The heat sink aperture 307 can have a length in a range from 140 mm to 120 mm (e.g., 150 mm). The heat sink aperture 307 can have a height (or depth) in a range from 3 mm to 15 mm (e.g., 4 mm, 8 mm). The width, length, or height of the heat sink aperture 307 can vary within or outside these ranges.

The power module 300 can include one or more ceramic plates 310 coupled to, disposed over or otherwise in contact with the first surface of the heat sink 305. For example, and as depicted in FIG. 3, the power module 300 can include first and second ceramic plates 310. Each of the first and second ceramic plates 310 can include a first surface (e.g., top surface) and a second surface (e.g., bottom surface). Each of the second surfaces of the first and second ceramic plates 310 can couple with, be disposed over or otherwise in contact with the first surface of the heat sink 305. The ceramic plates 310 can insulate the heat sink 305 from one or transistors (e.g., transistors 315) disposed within the power module 300. The ceramic plates 310 may include ceramic based material and can electrically insulate the heat sink 305 from transistors (e.g., transistors 315) disposed within the power module 300. For example, the ceramic plates 310 can prevent a short circuit condition between the heat sink 305 and the transistors (e.g., transistors 315) disposed within the power module 300. The ceramic plates 310 can have a length in a range from 150 mm to 225 mm. The ceramic plates 310 can have a width in a range from 15 mm to 35 mm. The ceramic plates 310 have a height (or thickness) in a range from 0.5 mm to 2 mm.

The power module 300 can include a plurality of transistors 315. The plurality of transistors 315 can couple with, be disposed over or otherwise in contact with the first surface of the ceramic plates 310. Each of the transistors 315 can include a plurality of leads 320. The transistors 315 can include discrete insulated-gate bipolar transistors (IGBT's), IGBT semiconductor dies, TO-247 transistors, or TO-247 discreet IGBT packages (e.g., TO-247 transistors, switches). Each of the transistors 315 can include one or more leads 320. For example, each of the transistors 315 may include three leads 320. Each of the three leads 320 can corresponds to at least one of the terminals of the transistor 315. For example, a first lead 320 can correspond to the base terminal or base lead. A second lead 320 can correspond to the collector terminal or collector lead. A third lead 320 can correspond to the emitter terminal or emitter lead. The leads 320 can have a generally straight or unbent shape. When the transistors 315 are fully coupled within the power module 300, the leads 320 can be bent, shaped or otherwise manipulated to couple with a respective one or more components (e.g., gate drive PCB 350, capacitor module 100) within the power module 300. For example, the leads 320 can be formed such that they extend perpendicular with respect to a first surface (e.g., top surface) of the transistors 315. For example, the leads 320 can be formed such that they have a bent shape and extend up with respect to a first surface (e.g., top surface) of the transistors 315.

The plurality of transistors 315 can be organized in a predetermined arrangement. For example, the plurality of transistors 315 can be disposed in one or more rows having multiple transistors 315 and the rows can be disposed such that the leads 320 of each of the transistors 315 are proximate to or adjacent to each other to allow for ease of coupling with components (e.g., gate drive PCB 160) of the power module 300. For example, a first plurality of transistors 315 can be arranged in a first row and a second plurality of transistors 315 can be arranged in a second row. Each of the rows of transistors 315 may include the same number of transistors or the rows of transistors 315 may include a different number of transistors 315. The transistors 315 in the same row can be positioned such that one or more side edges are in contact with a side edge of a single transistor 315 or two transistors 315 of the same row (e.g., one transistor 315 on each side). Thus, the transistors 315 can be arranged in a uniformed row along the first surface of the ceramic plates 310. The first plurality of transistors 315 can be spaced from the second plurality of transistors 315. The first plurality of transistors 315 can be evenly spaced or symmetrically from the second plurality of transistors 315 with respect to the first surface of the ceramic plates 310. For example, each of the transistors 315 in the first plurality of transistors 315 can be spaced the same distance from a corresponding transistor 315 of the second plurality of transistors 315. The first plurality of transistors 315 can be asymmetrically spaced from the second plurality of transistors 315 with respect to the first surface of the ceramic plates 310. For example, one or more of the transistors 315 in the first plurality of transistors 315 can be spaced different distances from corresponding transistors 315 of the second plurality of transistors 315. The one or more of the transistors 315 in the first plurality of transistors 315 can be spaced with respect to each other with a pitch (e.g., center to center spacing) in a range from 15 mm to 20 mm (e.g., 17.5 mm). The one or more of the transistors 315 in the second plurality of transistors 315 can be spaced with respect to each other with a pitch (e.g., center to center spacing) in a range from 15 mm to 20 mm (e.g., 17.5 mm). The one or more of the transistors 315 in the first plurality of transistors 315 can be spaced with respect to the one or more transistors 315 in the second plurality of transistors 315 in a range from 10 mm to 20 mm (e.g., 14 mm).

The power module 300 can include at least one temperature sensor 325 such as at least one transistor temperature sensing printed circuit board (PCB) 325. The transistor temperature sensing PCB 325 can include control electronics to communicate or monitor temperatures of different components of the power module 300, such as but not limited to transistors 315. For example, the transistor temperature sensing PCB 325 can be disposed proximate to the plurality of transistors 315 to provide temperature data corresponding to the plurality of transistors 315. For example, the transistor temperature sensing PCB 325 can be disposed between the ceramic plates 310 and the plurality of transistors 315 or between the heat sink 305 and the ceramic plates 310. The transistor temperature sensing PCB 325 can collect or retrieve temperature data corresponding to the plurality of transistors 315. The transistor temperature sensing PCB 325 can collect or retrieve temperature data corresponding to individual transistors 315, groups of transistors 315 or all of the plurality of transistors 315 collectively. For example, the temperature sensing can be extrapolated to predict IGBT junction temperatures. The transistor temperature sensing PCB 325 may be positioned such that it is compressed and sealed against a pocket of grease on the ceramic, adjacent to the transistors 315. For example, the transistor temperature sensing PCB 325 can be disposed a distance from the transistors 315 that ranges from 0 mm (e.g., in contact) to 2 mm. The distance between the transistor temperature sensing PCB 325 can vary outside these ranges.

The power module 300 can include a locator 330 (which can also be referred to herein as a locator guide or locator frame). The locator 330 can include a first surface (e.g., top surface) and a second surface (e.g., bottom surface). The second surface of the locator 330 can couple with, be disposed over or in contact with the first surface of the ceramic plates 310 or the heat sink 305. The locator 330 can include non-conductive material or plastic material. The locator 330 can have a length in a range from 200 mm to 225 mm (e.g., 215 mm). The locator 330 can have a height (e.g., thickness) in a range from 5 mm to 20 mm (e.g., 10 mm). The locator 330 can have a width in a range from 45 mm to 65 mm (e.g., 52 mm). The length, height, and width of the locator 330 can vary within and outside these ranges. The locator 330 can includes a plurality of slots 332 (e.g., apertures, holes, recesses) formed in a frame of the locator 330 to hold or couple various components of the power module 300 in place. The locator 330 can include the plurality of slots 332 to hold or couple with the transistors 315. At least on transistor 315 of the plurality of transistors 315 can be disposed or coupled with at least one slot 332 of the locator 330.

A plurality of clips 335 can couple the transistors 315 with the locator 330 (e.g., hold the transistors 315 in the slots 332 of the locator 330). For example, each of the plurality of transistors 315 can be disposed within at least one slot 332 of the locator 330 and the clips 335 can include spring clips that couple onto a side portion of the locator 330 and the transistors 315 to hold or compress the transistors 315 within a respective slot 332 to hold the transistors 315 in place and in contact with the locator 330. Fasteners 357 may be used to couple the transistors 315 with the locator 330. The locator 330 can include a plastic locator or plastic material.

The slots 332 of the locator 330 can include apertures, holes, recesses formed in a frame of the locator 330. The slots 332 can have varying shapes, sizes and dimensions and the shapes, sizes and dimensions of a particular slot 332 can be selected based at least in part on the shape, size or dimension of a component of the power module 300. For example, the locator 330 may include slots 332 for transistors 315, fasteners, clips, thermistors or thermal pads. The transistors slots have a generally rectangular shape which can be selected based on the particular transistor 315 to be used in the power module 300. The fastener slots can have a generally round shape and may include a threaded inner surface to couple with a threaded portion of a fastener. The thermistor slots can have a generally round shape. The power module 300 may include only one thermistor, thus only one thermistor slot may be used. However, two thermistor slots can be formed to provided symmetry and ease of manufacture. For example, having two thermistor slots can allow for the locator 330 to be rotated and a thermistor of the power module 300 can be disposed within either thermistor slot. The locator 330 can be formed having any number of slots 332, and the number of slots 332 can be selected based at least on the type of components of the power module 300. For example, the total number of slots 332 formed in the locator 330 can range from eight slots 332 to twenty four slots 332.

The locator 330 can operate as a guide or frame for a manufacture process of the power module 300, such as during a pick and place automation process, to increase an efficiency of the manufacture process. For example, the locator 330 can keep different components or parts of the power module 300 from moving around during manufacture resulting in a reducing an amount of fixturing (e.g., identifying and moving parts to correct locations) during the manufacture process. The power module 300 can be formed faster and more efficiently using the locator 330 as a guide for an automation device (e.g., pick and place automation machinery). The locator 330 can reduce the amount of human interaction with a particular manufacture process and therefore, the power module 300 can be formed using just the pick and place machinery and a grease dispenser device (or other form of fluid device).

The power module 300 can include a laminated bus bar 340. The laminated bus bar 340 can include a first surface (e.g., top surface) and a second surface (e.g., bottom surface). The second surface of the laminated bus bar 340 can couple with, be disposed over or in contact with the first surface of the locator 330 and portions of the first surface of the transistors 315 disposed in the slots 332 of the locator 330. The leads 320 of the transistors 315 can couple with portions of the laminated bus bar 340. For example, the laminated bus bar 340 can include a plurality of leads 347. Each of the plurality of leads 347 of the laminated bus bar 340 can couple with at least one lead 320 of the plurality of transistors 315. For example, at least two leads 347 of the laminated bus bar 340 can couple with at least two leads 320 of a transistor 315 of the plurality of transistors 315. The laminated bus bar 340 can have a length in a range from 200 mm to 225 mm. The laminated bus bar 340 can have a height (e.g., thickness) in a range from 5 mm to 20 mm. The laminated bus bar 340 can have a width in a range from 45 mm to 65 mm. The length, height, and width of the laminated bus bar 340 can vary within and outside these ranges. The laminated bus bar 340 can include or conductive material, such as but not limited to copper.

The laminated bus bar 340 can include includes two input terminals 342, 344 (e.g., positive input terminal and negative input terminal) disposed at or along a first side and an output terminal 345 disposed at a second, different side of the laminated bus bar 340. For example, the two input terminals 342, 344 can be disposed at an opposite or opposing side as compared to the output terminal 345. The first and second input terminals 342, 344 can include conductive material, such as but not limited to copper. The first and second input terminals 342, 344 can be formed in a variety of different shapes to accommodate coupling with an inverter bus bar (e.g., positive bus bar, negative bus bar). The first and second input terminals 342, 344 can have or include a straight shape, or a curved or bent shape. For example, the first and second input terminals 342, 344 can include a first portion that is parallel with respect to a first surface (e.g., top surface) of the laminated bus bar 340 and a second portion that is perpendicular with respect to the first surface of the laminated bus bar 340. The first input terminal 342 can couple with a positive inverter bus-bar (not shown) to receive a positive voltage and provide the positive voltage to the power module 300. The second input terminal 344 can couple with a negative bus-bar (not shown) to receive a negative voltage and provide the negative voltage to the power module 300. The first input terminal 342 can be disposed at a different level or height with respect to the side surface of the laminated bus bar 340 as compared with the second input terminal 344. For example, the first input terminal 342 can be disposed at first level or first height and the second input terminal 344 can be disposed at a second level or second height. The first level or first height can be greater than the second level or the second height. The first level or first height can be less than the second level or the second height.

The output terminal 345 can include conductive material, such as but not limited to copper. The output terminal 345 can be formed in a variety of different shapes to accommodate coupling with a inverter phase bus bar (not shown). The output terminal 345 can be formed having a straight shape, or a curved or bent shape. For example, the output terminal 345 can include a first portion that is parallel with respect to a first surface (e.g., top surface) of the laminated bus bar 340 and a second portion that is perpendicular with respect to the first surface of the laminated bus bar 340. The output terminal 345 can couple with a phase bus-bar (not shown) to provide power generated by the power module 300 to other electrical components of an electric vehicle.

The power module 300 can include a gate drive printed circuit board (PCB) 350. The gate drive PCB 350 can include a first surface (e.g., top surface) and a second surface (e.g., bottom surface). The second surface of gate drive PCB 350 can couple with, be disposed over or in contact with the first surface of the laminated bus bar 340. The gate drive PCB 350 can include control electronics to control one or more components of the power module 300 or communication electronics to communicate with and receive from or transmit signals to a control board of an inverter module. The gate drive PCB 350 can include control electronics and can generate and provide control signals to the transistors 315. For example, the leads 320 of the transistors 315 can extend through the locator 330 and the laminated bus bar 340 to couple with a portion or surface of the gate drive PCB 350. The gate drive PCB 350 can generate control signals, for example, to turn one or more of transistors 315 on or off, open or close. The gate drive PCB 350 can have a length in a range from 140 mm to 220 mm. The gate drive PCB 350 can have a height (e.g., thickness) in a range from 5 mm to 10 mm. The gate drive PCB 350 can have a width in a range from 60 mm to 100 mm. The length, height, and width of the gate drive PCB 350 can vary within and outside these ranges.

The power module 300 can include a dielectric gel tray 355. The dielectric gel tray 355 can include a first surface (e.g., top surface), a second surface (e.g., bottom surface) and can define an inner region that includes the second surface. The second surface of the dielectric gel tray 355 can couple with, be disposed over or contact the gate drive PCB 350. The dielectric gel tray 355 can couple with the capacitor module 100 though one or more fasteners 357. For example, the dielectric gel tray 355 can form a housing that is disposed over the gate drive PCB 350, laminated bus bar 340, locator 330, transistors 315, transistor temperature sensing PCB 325, the ceramic plates 310, the heat sink 305 such that that each of the gate drive PCB 350, laminated bus bar 340, locator 330, transistors 315, transistor temperature sensing PCB 325, the ceramic plates 310, and the heat sink 305 are disposed within the inner region defined by the dielectric gel tray 355 and thus covered by the dielectric gel tray 355 when the dielectric gel tray 355 is coupled with the capacitor module 100. For example, the dielectric gel tray 355 can include or be formed having an inner region that covers, submerges, or can be disposed about multiple components of the power module 300.

The dielectric gel tray 355 (e.g., potting compound container) can include poly carbon material, or other forms of high temperature plastic. The dielectric gel tray 355 can be formed using various injection molded techniques. The dielectric gel tray 355 can be disposed over one or more components of the power module 300 and operate as an insulator for the components (e.g., electronics) of the power module 300. The gel tray 355 can be formed having a length in a range from 160 mm to 240 mm. The gel tray 355 can be formed having a width in a range from 80 mm to 90 mm. The gel tray 355 can be formed having a height in a range from 40 mm to 60 mm. The dimensions and size of the gel tray 355 can vary within or outside these ranges.

The gel tray 355 includes one or more capacitive orifices 360. The capacitive orifices 360 can be used as inputs or outputs for the power module 300. For example, the capacitive orifices 360 can be formed as a hole or an access point to couple a power supply (e.g., DC power supply) to the power module 300. The gel tray 355 can include a first capacitive orifice 360 that couples the first input terminal 342 of the laminated bus bar 340 with a positive bus bar to provide a positive power supply to the power module 300. The gel tray 355 can include a second capacitive orifice 360 that couples the second input terminal 344 of the laminated bus bar 340 with a negative bus bar to provide a negative power supply to the power module 300. The gel tray 355 can include a third capacitive orifice 360 that couples the output terminal 345 of the laminated bus bar 340 with a phase bus bar to provide an output voltage generated by the power module 300 to other components of an electric vehicle. For example, capacitive orifices 360 can be formed as a hole or an access point to provide a power (e.g., voltage) generated by the power module 300 to other systems, such as a drive train unit of an electric vehicle.

Figure 4:
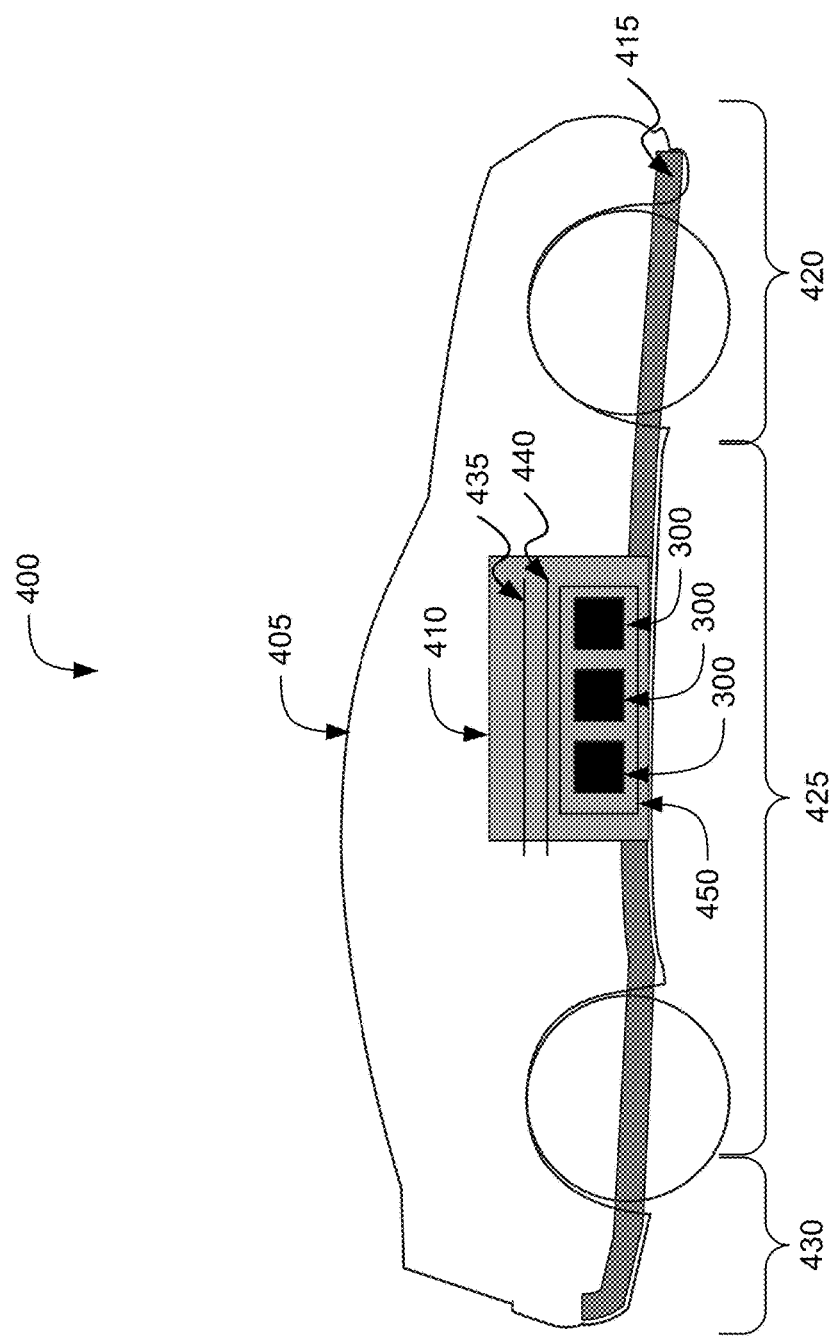
FIG. 4 is a block diagram depicting a cross-sectional view of an example electric vehicle installed with a battery pack.

FIG. 4 depicts an example cross-section view 400 of an electric vehicle 405 installed with a battery pack 410. The battery pack 410 can include an inverter module 450 having three power modules 300. Each of the power modules 300 can include at least one capacitor module 100. For example, each of the power modules 300 can generate a single phase power and can be coupled in a triplet configuration within the inverter module 450 to generate three phase power for the electric vehicle 405. The battery pack 410 can correspond to a drive train unit 410 of the electric vehicle 405. For example, the battery pack 410 can be disposed within or be a component of a drive train unit 410. The drive train unit 410 (and the battery pack 410) can provide power to the electric vehicle 405. For example, the drive train unit 410 may include components of the electric vehicle 405 that generate or provide power to drive the wheels or move the electric vehicle 405. The drive train unit 410 can be a component of an electric vehicle drive system. The electric vehicle drive system can transmit or provide power to different components of the electric vehicle 405. For example, the electric vehicle drive train system can transmit power from the battery pack 410 or drive train unit 410 to an axle or wheels of the electric vehicle 405.

The electric vehicle 405 can include an autonomous, semi-autonomous, or non-autonomous human operated vehicle. The electric vehicle 405 can include a hybrid vehicle that operates from on-board electric sources and from gasoline or other power sources. The electric vehicle 405 can include automobiles, cars, trucks, passenger vehicles, industrial vehicles, motorcycles, and other transport vehicles. The electric vehicle 405 can include a chassis 415 (sometimes referred to herein as a frame, internal frame, or support structure). The chassis 415 can support various components of the electric vehicle 405. The chassis 415 can span a front portion 420 (e.g., a hood or bonnet portion), a body portion 425, and a rear portion 430 (e.g., a trunk portion) of the electric vehicle 405. The front portion 420 can include the portion of the electric vehicle 405 from the front bumper to the front wheel well of the electric vehicle 405. The body portion 425 can include the portion of the electric vehicle 405 from the front wheel well to the back wheel well of the electric vehicle 405. The rear portion 430 can include the portion of the electric vehicle 405 from the back wheel well to the back bumper of the electric vehicle 405.

The battery pack 410 that includes the inverter module 450 having the three power modules 300 can be installed or placed within the electric vehicle 405. The battery pack 410 can include or couple with a power converter component. The battery pack 410 can be installed on the chassis 415 of the electric vehicle 405 within the front portion 420, the body portion 425 (as depicted in FIG. 4), or the rear portion 430. The battery pack 410 can couple with a first bus bar 435 and a second bus bar 440 that are connected or otherwise electrically coupled with other electrical components of the electric vehicle 405 to provide electrical power from the battery pack 410. For example, each of the power modules 300 can couple with the first bus-bar 435 and the second bus bar 440 to provide electrical power from the battery pack 410 to other electrical components of the electric vehicle 405.

Figure 5:
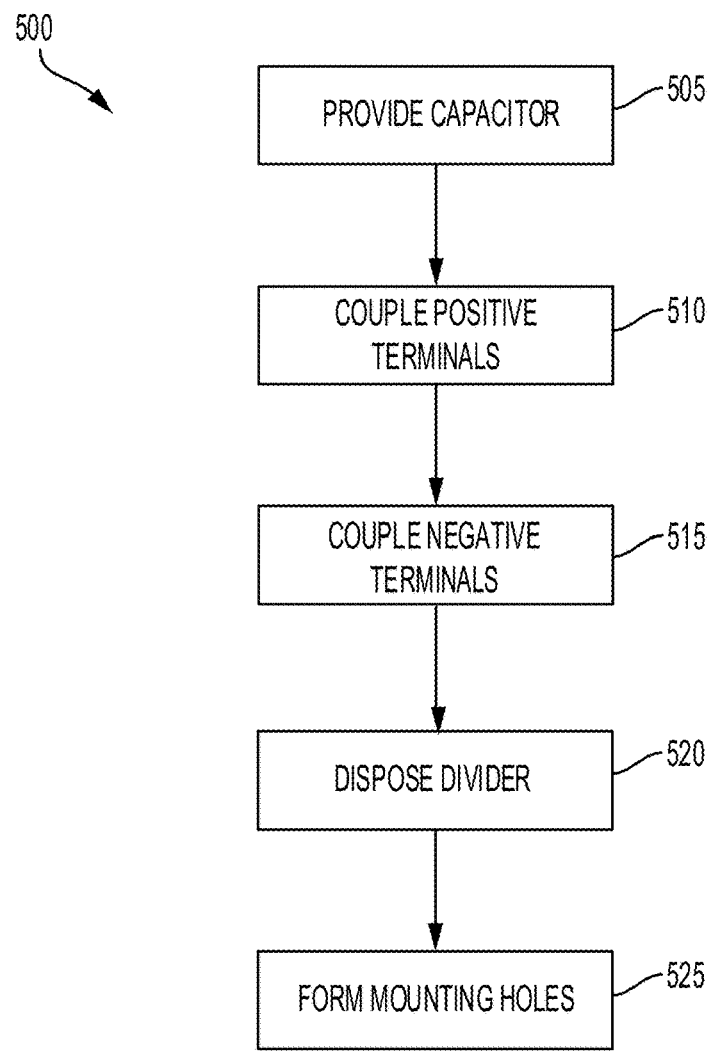
FIG. 5 depicts a flow diagram of an example method of forming a capacitor module of an inverter module of an electric vehicle, according to an illustrative implementation.

FIG. 5, among, others, depicts a method 500 for providing a capacitor module 100 of an inverter module 450 of an electric vehicle 405. For example, at least one capacitor module 100 can be disposed within each power module 300 that are coupled together to form the inverter module 450. The method 500 can include providing a capacitor (ACT 505). For example, method 500 an include providing a capacitor housing 105 of a capacitor module 100. The capacitor housing 105 can be formed using plastic material or non-conductive material. The capacitor housing 105 can form the base or outer surface of the capacitor module. For example, one or more capacitive elements can be disposed within the capacitor housing 105, such as but not limited to, a single capacitor film roll or multiple capacitor film rolls (e.g., three to four capacitor film rolls). The capacitor film rolls can be coupled with positive terminals and the negative terminals within the capacitor housing 105 through one or more tabs. The capacitor film rolls and thus the capacitor module 100 can have a capacitance value of 200-400 nanofarads (nF), e.g., 300 nF. The capacitance value can vary within or outside this range.

The method 500 can include coupling positive terminals 115 (ACT 510). For example, the method 500 can include coupling a plurality of positive terminals 115 with a first surface 107 of the capacitor housing 105 such that the plurality of positive terminals 115 extend from the first surface 107 at a first angle. Coupling the positive terminals 115 can include welding a portion of each of the positive terminals 115 to the capacitor housing 105 or to a positive bus bar within the capacitor housing 105. The positive terminals 115 can be welded to the positive base portion 205. The welding or connection techniques can vary and may include, but not limited to, resistive welding. The first angle can range from 45 degrees to 135 degrees with respect to the first surface 107 (e.g., top surface) of the capacitor housing 105. For example, the first angle can include 90 degrees (e.g., perpendicular) with respect to the first surface 107 of the capacitor housing 105. The positive terminals 115 can be formed from conductive material, such as but not limited to copper. The positive terminals 115 can couple with the capacitor housing 105 such that a portion of each of the positive terminals 115 extends into an inner region formed by the capacitor housing 105 can couples with capacitive elements within the capacitor housing 105. The positive terminals 115 can couple with or correspond to leads or terminals of a positive bus bar of the capacitor module 100.

The method 500 can include coupling negative terminals 120 (ACT 515). For example, the method 500 can include coupling a plurality of negative terminals 120 with the first surface 107 of the capacitor housing 105 such that the plurality of negative terminals 120 extend from the first surface 107 at the first angle. Coupling the negative terminals 120 can include welding a portion of each of the negative terminals 120 to the capacitor housing 105 or to a negative bus bar within the capacitor housing 105. The negative terminals 120 can be welded to the negative base portion 215. The welding or connection techniques can vary and may include, but not limited to, resistive welding. The negative terminals 120 can extend from the first surface 107 of the capacitor housing 105 at the same angle as compared to the positive terminals 115 or the negative terminals 120 can extend from the first surface 107 of the capacitor housing 105 at a different angle as compared to the positive terminals 115. The negative terminals 120 can be formed from conductive material, such as but not limited to copper. The negative terminals 115 can couple with the capacitor housing 105 such that a portion of each of the negative terminals 115 extends into an inner region formed by the capacitor housing 105 can couples with capacitive elements within the capacitor housing 105. The negative positive terminals 115 can couple with or correspond to leads or terminals of a negative bus bar of the capacitor module 100.

The method 500 can include disposing a divider 110 (ACT 520). For example, the method 500 can include disposing a divider 110 between the plurality of positive terminals 115 and the plurality of negative terminals 120. Disposing the divider 110 can include welding the divider 110 to the first surface 107 of the capacitor housing 105. The welding or connection techniques can vary and may include, but not limited to, resistive welding. The divider 110 can couple with the first surface 107 of the capacitor housing 105. The divider 110 can electrically isolate the plurality of positive terminals 115 from the plurality of negative terminals 120. For example, the divider 110 can be formed using non-conductive material, insulation material, or plastic material.

Disposing the divider 110 can include forming a plurality of separating elements 235 on a first side surface 237 of the divider 110 and forming a plurality of separating elements 235 on a second side surface 237 of the divider. For example, separating elements 235 can be formed on each side surface 237 of the divider 110 to space the positive terminals 115 form each other and space the negative terminals 120 from each other. The positive terminals 115 can couple with or be disposed next to a first side surface 237 of the divider 110. At least one separating element 235 can be positioned between each pair of positive terminals 115 to electrically insulate the respective positive terminals 115 from each other. The negative terminals 120 can couple with or be disposed next to a second side surface 237 (e.g., opposing surface that the positive terminals 115 are coupled with) of the divider 110. At least one separating element 235 can be positioned between each pair of negative terminals 120 to electrically insulate the respective negative terminals 120 from each other. The separating elements 235 can be formed using non-conductive material, such as but not limited to, plastic material. The separating elements 235 can be formed having a uniform spacing with respect to each other along the first side surface 237 and the second side surface 237 of the divider 110. The spacing or arrangement of the separating elements 235 can be selected based in part on the dimensions of the positive terminals 115 or negative terminals 120.

Disposing the divider 110 can include coupling an extension portion 230 with the divider 110. The extension portion 230 can be disposed between the plurality of positive terminals 115 and the plurality of negative terminals 120 to electrically insulate the plurality of positive terminals 115 from the plurality of negative terminals 120. The extension portion 230 can be a region of or component of the divider 110. For example, the extension portion 230 can correspond to a top portion of the divider 110. The extension portion 230 can be a separate component coupled with a top portion of the divider 110. The extension portion 230 can be formed such that it extends perpendicular with respect to a first surface 107 (e.g., top surface) of the capacitor housing 105. For example, the extension portion 230 can extend at the same angle as the divider 110 with respect to the first surface 107 of the housing 105. The extension portion 230 can be formed using non-conductive material, such as but not limited, to plastic material.

Disposing the divider 110 can include coupling a first divider support member 140 with a first edge surface 112 or first side surface 112 of the divider 110 to hold the plurality of positive terminals 115 and the plurality of negative terminals 120. Disposing the divider 110 can include coupling a second divider support member 140 with a second edge surface 114 or second side surface 114 of the divider 110 to hold the plurality of positive terminals 115 and the plurality of negative terminals 120. Support members 140 can be formed on each edge surface 112, 114 (e.g., opposing ends of the divider 110) to couple the positive terminals 115 and the negative terminals 120 with the divider or to hold the positive terminals 115 and the negative terminals 120 in place. The support members 140 can be formed using non-conductive material, such as but not limited to, plastic material. The supports members 140 can couple with the edge surfaces 112, 114 using an adhesive layer or adhesive material. For example, the support members 140 can be glued, cemented or pasted with edge surfaces 112, 114 of the divider 110.

The method 500 can include forming mounting holes 125 (ACT 525). For example, the method 500 can include forming a plurality of mounting holes 125 on an outer surface of the capacitor housing 105. One or more mounting holes 125 can be formed on the capacitor housing 105 to aid in coupling the capacitor housing 105 with other components of a power module 300. For example, the mounting holes 125 can couple with mounting feet or other connection points of a gel tray of the power module 300. The mounting holes 125 can include or be formed as connection points on one or more portions on the capacitor housing 105. The mounting holes 125 can include holes, orifices, or hollow portions formed through one or more portions of the capacitor housing 105. For example, the mounting holes 125 can be formed by creating a hole completely though a portion of the capacitor housing 105 or may be formed by creating a hole having a certain depth into a surface of the capacitor housing 105. The mounting holes 125 can be formed having a threaded inner surface to receive or engage a threaded outer surface of a fastener, screw or bolt. The mounting holes 125 can be formed having a round shape, spherical shape, rectangular shape, octagonal shape, or other shape.

Providing the capacitor module 100 can include disposing a capacitor module 100 in an inverter module 450 of a drive train unit of an electric vehicle 405. For example, at least one capacitor module 100 can be disposed within a power module 300. One or more power modules 300 can be disposed within an inverter module 450 of a drive train unit. For example, three power modules 300, each having at least one capacitor module 100, can be coupled together in a triplet configuration and disposed within an inverter module 450 to form a three phase inverter module 450. The inverter module 450 can be disposed within a drive train unit or a battery pack 410 of an electric vehicle 405. The drive train unit or the battery pack 410 can include a single inverter module 450 or multiple inverter modules 450. Providing the capacitor module 100 can include providing the capacitor module 100 in an inverter module 450 of a drive train unit or battery pack 410. The drive train unit, having the inverter module 450, or the battery pack 410, having the inverter module 450, can be provided in the electric vehicle 405.

Figure 6:
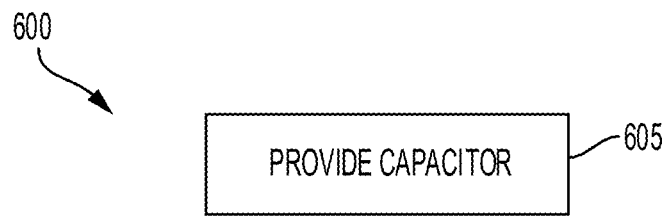
FIG. 6 depicts a flow diagram of an example method of providing a capacitor module of an inverter module of an electric vehicle, according to an illustrative implementation.

FIG. 6, among others, depicts a method 600 for providing a capacitor module 100 of an inverter module 450 of an electric vehicle 405. The method 600 can include providing a capacitor 100 (ACT 605). For example, method 600 can include proving a capacitor module 100 of an inverter module 450 of an electric vehicle 405. The capacitor module 100 can include a capacitor housing 105. The capacitor module 100 can include a plurality of positive terminals 115 coupled with a first surface 107 of the capacitor housing 105 and extending from the first surface 107 at a first angle. The capacitor module 100 can include a plurality of negative terminals 120 coupled with the first surface 107 of the capacitor housing 105 and extending from the first surface 107 at the first angle. The capacitor module 100 can include a divider 110 coupled with the first surface 107 of the capacitor housing 105. The divider 110 can be disposed between the plurality of positive terminals 115 and the plurality of negative terminals 120. The divider can electrically isolate the plurality of positive terminals 115 from the plurality of negative terminals 120. The capacitor module 100 can include a plurality of mounting holes 125 formed on an outer surface of the capacitor housing 105.

While acts or operations may be depicted in the drawings or described in a particular order, such operations are not required to be performed in the particular order shown or described, or in sequential order, and all depicted or described operations are not required to be performed. Actions described herein can be performed in different orders.

Having now described some illustrative implementations, it is apparent that the foregoing is illustrative and not limiting, having been presented by way of example. Features that are described herein in the context of separate implementations can also be implemented in combination in a single embodiment or implementation. Features that are described in the context of a single implementation can also be implemented in multiple implementations separately or in various sub-combinations. References to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any act or element may include implementations where the act or element is based at least in part on any act or element.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. For example the voltage across terminals of battery cells can be greater than 5V. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

Systems and methods described herein may be embodied in other specific forms without departing from the characteristics thereof. For example, descriptions of positive and negative electrical characteristics may be reversed. For example, elements described as negative polarity elements can instead be configured as positive polarity elements and elements described as positive polarity elements can instead be configured as negative polarity elements. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A capacitor module of an inverter module to provide electrical power to an electric vehicle, comprising:
    a capacitor housing;
    a plurality of positive terminals coupled with a first surface of the capacitor housing and extending from the first surface at a first angle;
    a plurality of negative terminals coupled with the first surface of the capacitor housing;
    a divider coupled with the first surface of the capacitor housing, the divider disposed between the plurality of positive terminals and the plurality of negative terminals, and the divider electrically isolates the plurality of positive terminals from the plurality of negative terminals;
    a plurality of mounting holes formed on an outer surface of the capacitor housing;
    a first plurality of separating elements formed on a first side surface of the divider, each separating element of the first plurality of separating elements disposed between a pair of positive terminals of the plurality of positive terminals; and
    a second plurality of separating elements formed on a second side surface of the divider, each separating element of the second plurality of separating elements disposed between a pair of negative terminals of the plurality of negative terminals.

2. The capacitor module of claim 1, comprising:
    a dielectric gel tray coupled with capacitor housing through the plurality of mounting holes, the dielectric gel tray defining an inner region, the inner region having the plurality of positive terminals, the plurality of negative terminals, and the divider disposed therein.

3. The capacitor module of claim 1, comprising:
    an extension portion of the divider, the extension portion disposed between the plurality of positive terminals and the plurality of negative terminals to electrically insulate the plurality of positive terminals from the plurality of negative terminals.

4. The capacitor module of claim 1, comprising:
    an extension portion of the divider, the extension portion having a height in a range from 1 mm to 4 mm.

5. The capacitor module of claim 1, comprising:
    each separating element of the first plurality of separating elements formed having uniform spacing with respect to each other on the first side surface of the divider; and
    each separating element of the second plurality of separating elements formed having uniform spacing with respect to each other on the second side surface of the divider.

6. The capacitor module of claim 1, comprising:
    each separating element of the first plurality of separating elements and the second plurality of separating elements formed at a height in a range from 18 mm to 22 mm with respect to a bottom end of the divider.

7. The capacitor module of claim 1, comprising:
    the plurality of positive terminals including a positive base portion and a plurality of positive leads, the plurality of positive leads extending from the positive base portion.

8. The capacitor module of claim 1, comprising:
    each of the plurality of positive terminals including at least one positive lead, each of the positive leads having a thickness in a range from 0.5 mm to 1.5 mm.

9. The capacitor module of claim 1, comprising:
    the plurality of negative terminals including a negative base portion and a plurality of negative leads, the plurality of negative leads extending from the negative base portion.

10. The capacitor module of claim 1, comprising:
    each of the plurality of negative terminals including at least one negative lead, each of the negative leads having a thickness in a range from 0.5 mm to 1.5 mm.

11. The capacitor module of claim 1, comprising:
    a first divider support member coupled with the first side surface of the divider to hold the plurality of positive terminals and the plurality of negative terminals; and
    a second divider support member coupled with the second side surface of the divider to hold the plurality of positive terminals and the plurality of negative terminals.

12. The capacitor module of claim 1, comprising:
    the capacitor module disposed in an inverter module of a drive train unit, the drive train unit having multiple inverter modules.

13. The capacitor module of claim 1, comprising:
    the capacitor module disposed in an inverter module of a drive train unit, the drive train unit disposed in an electric vehicle.

14. A method for providing a capacitor module of an inverter module of an electric vehicle, the method comprising:
    providing a capacitor housing of a capacitor module;
    coupling a plurality of positive terminals with a first surface of the capacitor housing such that the plurality of positive terminals extend from the first surface at a first angle;
    coupling a plurality of negative terminals with the first surface of the capacitor housing;
    disposing a divider between the plurality of positive terminals and the plurality of negative terminals, the divider coupled with the first surface of the capacitor housing, and the divider electrically isolates the plurality of positive terminals from the plurality of negative terminals;
forming a plurality of mounting holes on an outer surface of the capacitor housing;
forming a first plurality of separating elements on a first side surface of the divider, each separating element of the first plurality of separating elements disposed between a pair of positive terminals of the plurality of positive terminals; and
forming a second plurality of separating elements on a second side surface of the divider, each separating element of the second plurality of separating elements disposed between a pair of negative terminals of the plurality of negative terminals.

15. The method of claim 14, comprising:
forming each separating element of the first plurality of separating elements on the first side surface having uniform spacing along the first side surface of the divider with respect to each other; and
forming each separating element of the second plurality of separating elements on the second side surface of the divider having uniform spacing along the second side surface of the divider with respect to each other.

16. The method of claim 14, comprising:
coupling an extension portion with the divider, the extension portion disposed between the plurality of positive terminals and the plurality of negative terminals to electrically insulate the plurality of positive terminals from the plurality of negative terminals.

17. The method of claim 14, comprising:
coupling a first divider support member with the first side surface of the divider to hold the plurality of positive terminals and the plurality of negative terminals; and
coupling a second divider support member with the second side surface of the divider to hold the plurality of positive terminals and the plurality of negative terminals.

18. The method of claim 14, comprising:
disposing the capacitor module in an inverter module of a drive train unit, the drive train unit having multiple inverter modules.

19. The method of claim 14, comprising:
providing the capacitor module in an inverter module of a drive train unit; and
providing the drive train unit in an electric vehicle.

20. An electric vehicle, comprising:
a capacitor module of an inverter module of an electric vehicle, the capacitor module comprising:
a capacitor housing;
a plurality of positive terminals coupled with a first surface of the capacitor housing and extending from the first surface at a first angle;
a plurality of negative terminals coupled with the first surface of the capacitor housing and extending from the first surface;
a divider coupled with the first surface of the capacitor housing, the divider disposed between the plurality of positive terminals and the plurality of negative terminals, and the divider electrically isolates the plurality of positive terminals from the plurality of negative terminals;
a plurality of mounting holes formed on an outer surface of the capacitor housing;
a first plurality of separating elements formed on a first side surface of the divider, each separating element of the first plurality of separating elements disposed between a pair of positive terminals of the plurality of positive terminals; and
a second plurality of separating elements formed on a second side surface of the divider, each separating element of the second plurality of separating elements disposed between a pair of negative terminals of the plurality of negative terminals.

* * * * *